US 6,722,114 B1

(12) United States Patent
Poole et al.

(10) Patent No.: US 6,722,114 B1
(45) Date of Patent: Apr. 20, 2004

(54) SAFE LAWN MOWER BLADE ALTERNATIVE SYSTEM

(76) Inventors: James Terry Poole, 5501 Kruger Dr., Jonesboro, AR (US) 72402; Robert C. Burrow, 5501 Kruger Dr., Jonesboro, AR (US) 72402

(*) Notice: Subject to any disclaimer, the term of this patent is extended or adjusted under 35 U.S.C. 154(b) by 70 days.

(21) Appl. No.: 09/846,547

(22) Filed: May 1, 2001

(51) Int. Cl.[7] .............................................. A01D 34/82
(52) U.S. Cl. ........................... 56/295; 56/255; 56/17.5; 56/DIG. 21
(58) Field of Search .................. 56/12.7, 17.5, 56/255, 295, DIG. 20, DIG. 17; 30/276, DIG. 5

(56) References Cited

U.S. PATENT DOCUMENTS

| | | | | |
|---|---|---|---|---|
| 3,465,508 A | * | 9/1969 | Edwards ...................... | 56/295 |
| 4,107,841 A | * | 8/1978 | Rebhun ...................... | 30/276 |
| 4,936,884 A | * | 6/1990 | Campbell ................... | 30/276 |
| 5,617,636 A | * | 4/1997 | Taggett et al. .............. | 30/276 |
| 5,622,035 A | * | 4/1997 | Kondo et al. ................ | 30/276 |
| 5,852,876 A | * | 12/1998 | Wang ......................... | 30/276 |
| 6,119,350 A | * | 9/2000 | Sutliff et al. ................ | 30/276 |

\* cited by examiner

Primary Examiner—Thomas B. Will
Assistant Examiner—Meredith Petravick
(74) Attorney, Agent, or Firm—Edward P. Dutkiewicz

(57) ABSTRACT

A lawn mower blade assembly comprises a bottom hub and a top hub, both provided with central apertures. Provided around the bottom and top hubs are a plurality of equally spaced holes. An intermediate plate is coupled between the hubs. A plurality of generally V-shaped recesses open into the periphery of the hubs. A plurality of blades are provided, each having interior and exterior portions. A hole is provided through the interior portion. The exterior portion is flexible. The interior portion is adapted to fit in the V-shaped recesses of the intermediate plate. A plurality of bolts are adapted to pass through the aligned holes of the hubs and the blades and with hex nuts adapted to receive the pivot bolts. A lock bolt, having a head and threaded end is positioned through the apertures of the cutting assembly to removably couple with the threaded aperture of the drive shaft.

1 Claim, 3 Drawing Sheets

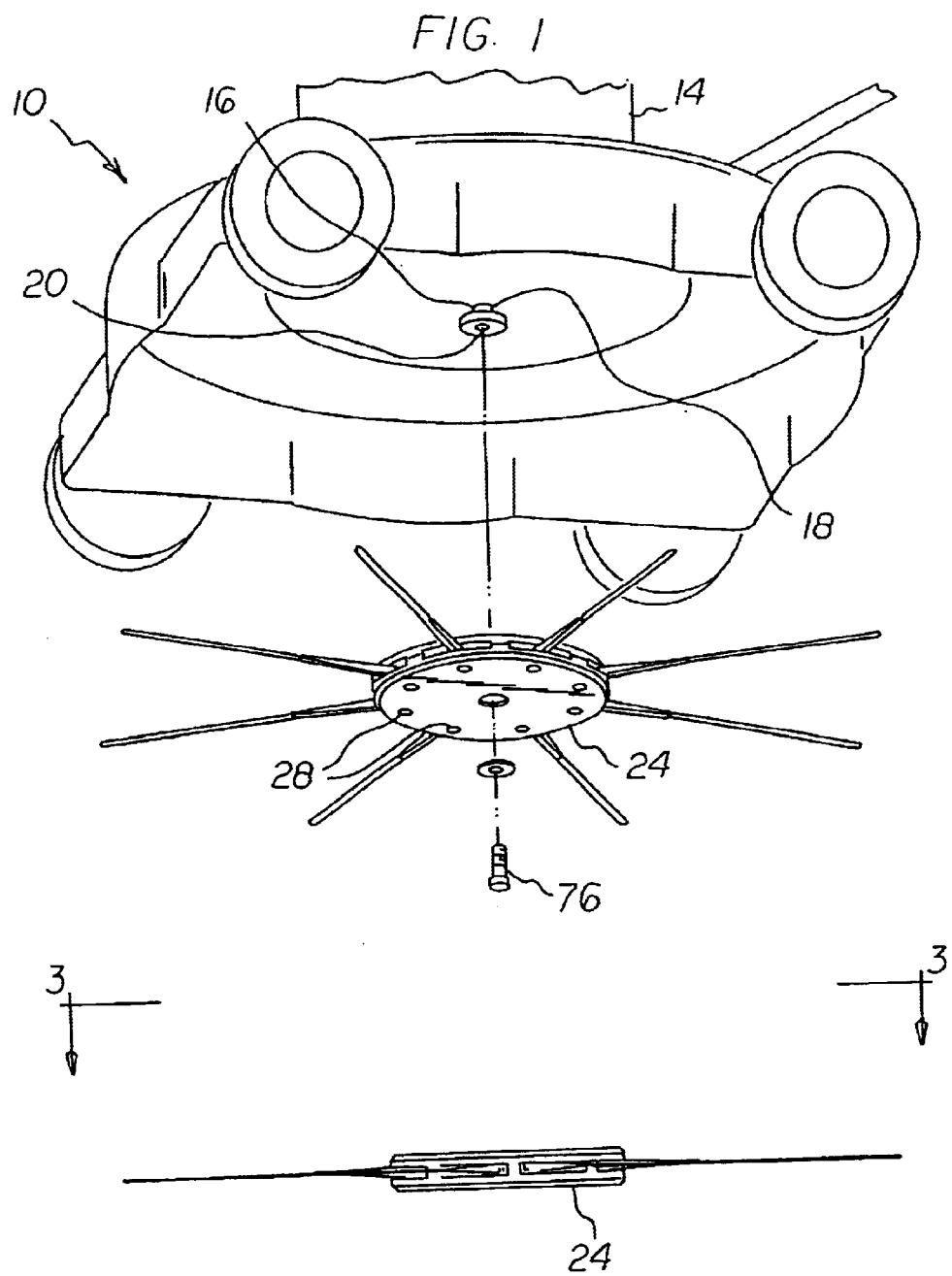

SAFE LAWN MOWER BLADE ALTERNATIVE SYSTEM

BACKGROUND OF THE INVENTION

1. Field of the Invention

The present invention relates to a safe lawn mower blade alternative system and more particularly pertains to cutting grass without the risk of harmful injury.

2. Description of the Prior Art

The use of lawn mower blades of known designs and configurations is known in the prior art. More specifically, lawn mower blades of known designs and configurations previously devised and utilized for the purpose of cutting grass through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,054,922 to Ballas, et al discloses a rotary cutting assembly. U.S. Pat. No. 4,065,913 to Fisher, et al discloses a safe cutter disc assembly. U.S. Pat. No. 4,086,700 to Inada discloses a cutting head for a mower. U.S. Pat. No. 4,189,905 to Frantello discloses a vertically extending attachment for the vertically extending drive-shaft of a rotary lawn mower. Lastly, U.S. Pat. No. 5,907,947 to Poole et al discloses a safety lawn mower blade.

While these devices fulfill their respective, particular objectives and requirements, the aforementioned patents do not describe a safe lawn mower blade alternative system that allows cutting grass without the risk of harmful injury.

In this respect, the safe lawn mower blade alternative system according to the present invention substantially departs from the conventional concepts and designs of the prior art, and in doing so provides an apparatus primarily developed for the purpose of cutting grass without the risk of harmful injury.

Therefore, it can be appreciated that there exists a continuing need for a new and improved safe lawn mower blade alternative system which can be used for cutting grass without the risk of harmful injury. In this regard, the present invention substantially fulfills this need.

SUMMARY OF THE INVENTION

In view of the foregoing disadvantages inherent in the known types of lawn mower blades of known designs and configurations now present in the prior art, the present invention provides an improved safe lawn mower blade alternative system. As such, the general purpose of the present invention, which will be described subsequently in greater detail, is to provide a new and improved safe lawn mower blade alternative system and method which has all the advantages of the prior art and none of the disadvantages.

To attain this, the present invention essentially comprises a lawn mower. The lawn mower has a motor. The motor has a rotatable drive shaft with associated fittings. A threaded aperture is formed in the drive shaft. A bottom hub is provided next. The bottom hub is in a circular configuration. Through the bottom hub is a central circular aperture. Around the bottom hub are eight equally spaced bolt holes. The bolt holes are adjacent to the periphery. A lower intermediate plate is coupled to the upper surface of the bottom hub. Centered over the central circular aperture is a generally oval recess. Eight generally V-shaped recesses with radiating side edges are provided around an opening into the periphery of the bottom hub. Next provided is a top hub. The top hub is in a circular configuration. Provided through the top hub is a central square aperture. Eight equally spaced bolt holes are provided adjacent to the periphery. An upper intermediate plate is coupled to the lower surface of the top hub. A generally oval recess is centered beneath the central aperture. Eight generally V-shaped recesses with radiating side edges are provided around an opening into the periphery of the top hub. Further provided is a metal weight. The weight is in a generally oval configuration. A generally oval aperture is provided through the center of the weight. The weight is positioned within the oval recesses of the top hub and bottom hub when coupled together. Provided next are eight cutting blades. The blades are fabricated of plastic. Each blade has an interior portion, an intermediate portion, and an exterior portion. The interior portion is in a generally circular configuration. A hole is provided through the interior portion. The hole is positioned between the holes of the top and bottom hubs. The interior and intermediate portions are relatively rigid. The exterior portion is flexible. The exterior portion is adapted to be trimmed to fit various lawn mower sizes. The interior portion is adapted to fit between the V-shaped recesses of the top and bottom hub when in a closed configuration. Next provided are eight cutting blade pivot bolts. The pivot bolts have a head. The pivot bolts have a male threaded portion. The pivot bolts are adapted to pass through aligned holes of the bottom hub of the blades. Eight hex nuts are adapted to receive the male threaded portions of the pivot bolts. In this manner, the blades are able to pivot in an arc of about 45 degrees with respect to the top hub and bottom hub. The top hub, bottom hub, metal weight, cutting blades, pivot bolts, and hex nuts form a rotatable cutting assembly with the apertures thereof in axial alignment and in alignment with the threaded aperture of the drive shaft. Provided next is a lock bolt. The lock bolt has a head. The lock bolt also has a threaded end. The threaded end is positioned through the apertures of the cutting assembly to removably couple with the threaded aperture of the drive shaft. A plurality of bushings are provided. The bushings are adapted to the various different types of associated fittings of the drive shaft. Each bushing has a top end and a bottom end with a central aperture. The top end is in a generally rectangular configuration. A variety of recess are adapted to fit the associated fittings of the drive shaft of the lawn mower. The bottom end is of a preselected configuration with a circumference less than that of the central aperture of the top hub. In this manner, the entire bushing may be positioned within the square recess of the top hub thereby allowing the drive shaft to abut the cutting assembly and allow the locking bolt to pass through the central apertures for releasably securing the cutting assembly to the lawn mower. Even further provided is a plurality of apertures. The apertures are provided on the central region of the top hub. The apertures enable any protuberances from the lawn mower to be adapted to fit with the cutting system. Last provided are a plurality of flanges. The flanges are provided on the central region of the top hub. The flanges enable apertures of the lawn mower to be adapted to fit with the cutting system.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved safe lawn mower blade alternative system which has all of the advantages of the prior art lawn mower blades of known designs and configurations and none of the disadvantages.

It is another object of the present invention to provide a new and improved safe lawn mower blade alternative system which may be easily and efficiently manufactured and marketed.

It is further object of the present invention to provide a new and improved safe lawn mower blade alternative system which is of durable and reliable constructions.

An even further object of the present invention is to provide a new and improved safe lawn mower blade alternative system which is susceptible of a low cost of manufacture with regard to both materials and labor, and which accordingly is then susceptible of low prices of sale to the consuming public, thereby making such safe lawn mower blade alternative system economically available to the buying public.

Even still another object of the present invention is to provide a safe lawn mower blade alternative system for cutting grass without the risk of harmful injury.

Lastly, it is an object of the present invention to provide a new and improved lawn mower blade assembly comprising a bottom hub and a top hub, both provided with central apertures. Provided around the bottom and top hubs are a plurality of equally spaced holes. An intermediate plate is coupled between the hubs. A plurality of generally V-shaped recesses open into the periphery of the hubs. A plurality of blades are provided, each having interior and exterior portions. A hole is provided through the interior portion. The exterior portion is flexible. The interior portion is adapted to fit in the V-shaped recesses of the intermediate plate. A plurality of bolts are adapted to pass through the aligned holes of the hubs and the blades and with hex nuts adapted to receive the pivot bolts. A lock bolt, having a head and threaded end is positioned through the apertures of the cutting assembly to removably couple with the threaded aperture of the drive shaft.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an exploded perspective illustration of the safe lawn mower blade alternative system constructed in accordance with the principles of the present invention.

FIG. 2 is a side elevational view of the lawn mower blade assembly as illustrated in FIG. 1.

The same reference numerals refer to the same parts throughout the various Figures.

DESCRIPTION OF THE PREFERRED EMBODIMENT

Figure 3:
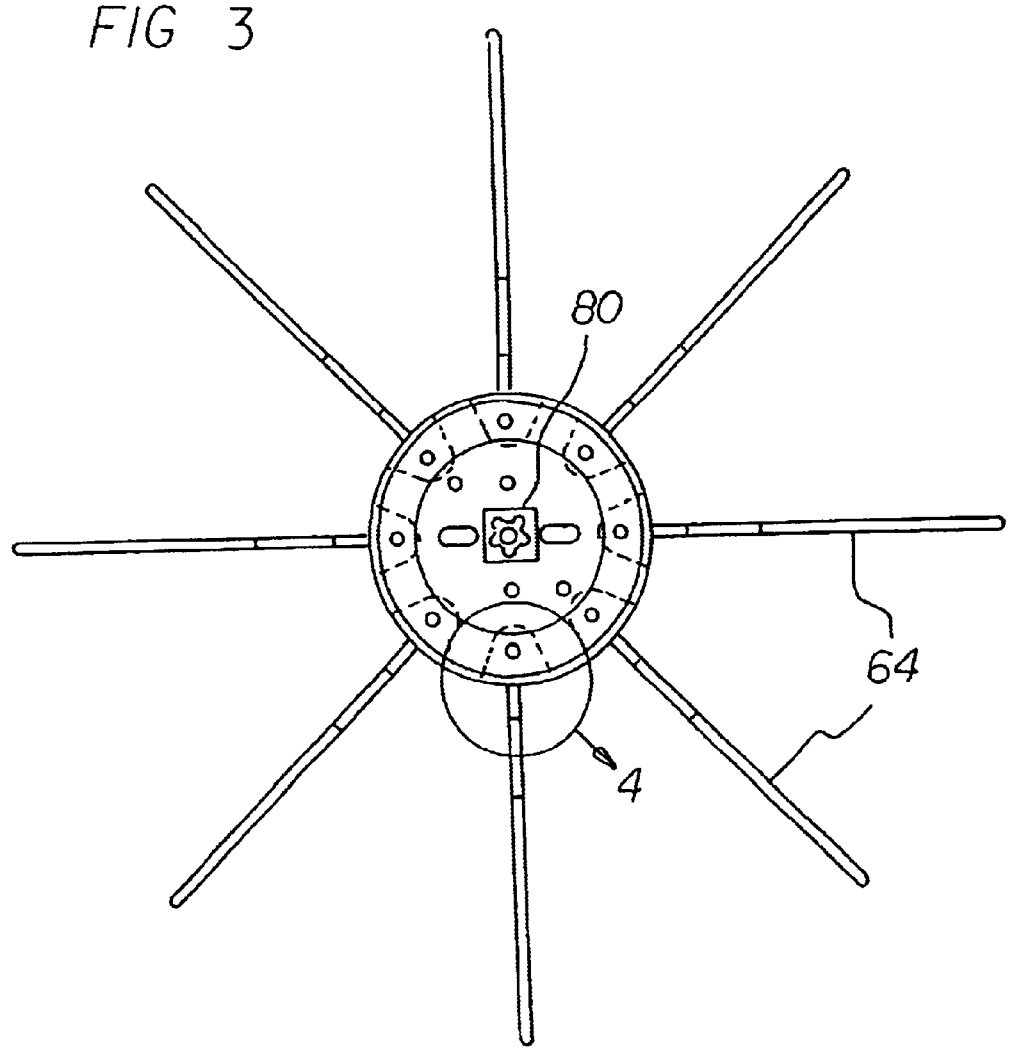
FIG. 3 is a top elevational view of the lawn mower blade assembly taken along line 3—3 of FIG. 2.
Figure 4:
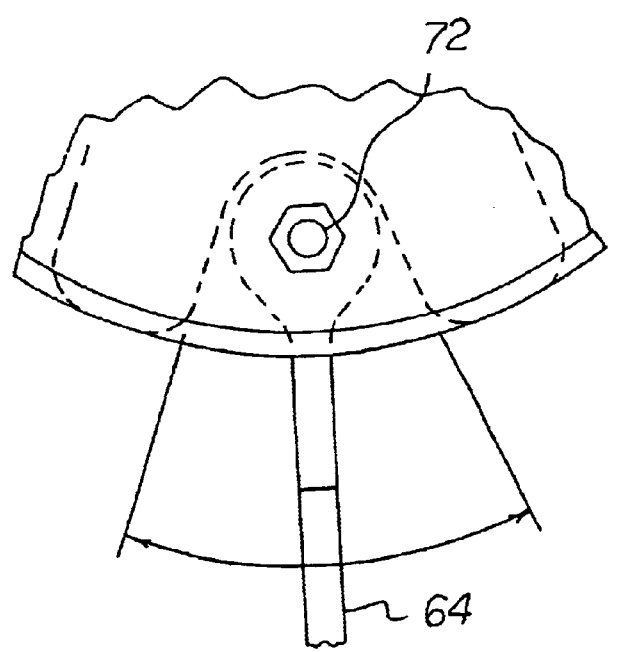
FIG. 4 is an enlarged top elevational view of the lawn mower blade assembly taken at circle 4 of FIG. 3.
Figure 5:
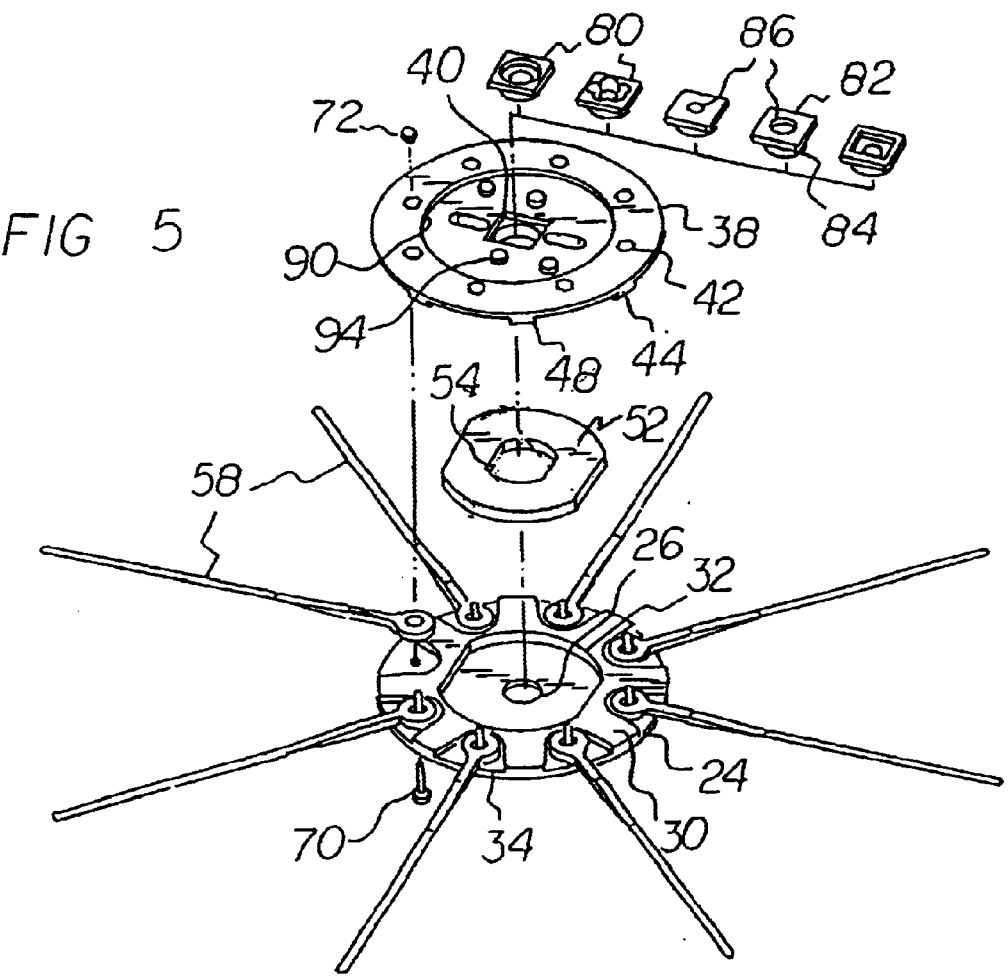
FIG. 5 is an exploded perspective illustration of the lawn mower blade assembly as shown in the prior Figures.
Figure 6:
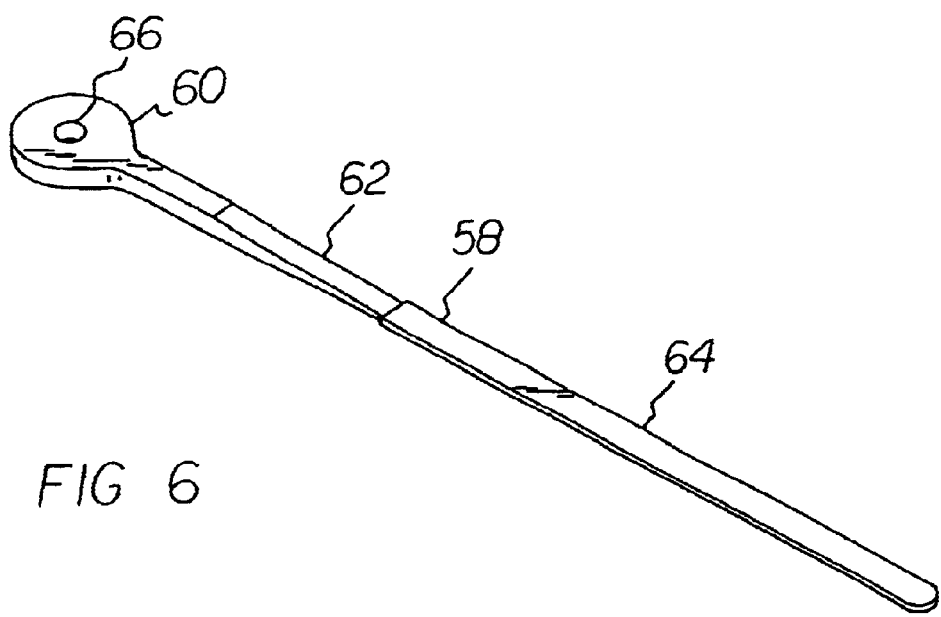
FIG. 6 is a perspective illustration of one of the blades of the lawn mower blade assembly of the prior Figures.

With reference now to the drawings, and in particular to FIG. 1 thereof, the preferred embodiment of the new and improved safe lawn mower blade alternative system embodying the principles and concepts of the present invention and generally designated by the reference numeral 10 will be described.

The present invention, the safe lawn mower blade alternative system 10 is comprised of a plurality of components. Such components in their broadest context include a bottom hub, a top hub, a plurality of blades, and a lock bolt. Such components are individually configured and correlated with respect to each other so as to attain the desired objective.

First provided is a lawn mower 14. The lawn mower has a motor 16. The motor has a rotatable drive shaft 18 with associated fittings. A threaded aperture 20 is formed in the drive shaft.

A bottom hub 24 is provided next. The bottom hub is in a circular configuration. Through the bottom hub is a central circular aperture 26. Around the bottom hub are eight equally spaced bolt holes 28. The bolt holes are adjacent to the periphery. A lower intermediate plate 30 is coupled to the upper surface of the bottom hub. Centered over the central circular aperture is a generally oval recess 32. Eight generally V-shaped recesses 34 with radiating side edges are provided around an opening into the periphery of the bottom hub.

Next provided is a top hub 38. The top hub is in a circular configuration. Provided through the top hub is a central square aperture 40. Eight equally spaced bolt holes 42 are provided adjacent to the periphery. An upper intermediate plate 44 is coupled to the lower surface of the top hub. A generally oval recess 46 is centered beneath the central aperture. Eight generally V-shaped recesses 48 with radiating side edges are provided around an opening into the periphery of the top hub.

Further provided is a metal weight 52. The weight is in a generally oval configuration. A generally oval aperture 54 is provided through the center of the weight. The weight is positioned within the oval recesses of the top hub and bottom hub when coupled together.

Provided next are eight cutting blades 58. The blades are fabricated of plastic. Each blade has an interior portion 60, an intermediate portion 62, and an exterior portion 64. The interior portion is in a generally circular configuration. A hole 66 is provided through the interior portion. The hole is positioned between the holes of the top and bottom hubs. The interior and intermediate portions are relatively rigid. The exterior portion is flexible. The exterior portion is adapted to be trimmed to fit various lawn mower sizes. The interior portion is adapted to fit between the V-shaped recesses of the top and bottom hub when in a closed configuration.

Next provided are eight cutting blade pivot bolts 70. The pivot bolts have a head. The pivot bolts have a male threaded portion. The pivot bolts are adapted to pass through aligned holes of the bottom hub of the blades. Eight hex nuts 72 are adapted to receive the male threaded portions of the pivot bolts. In this manner, the blades are able to pivot in an arc of about 45 degrees with respect to the top hub and bottom hub. The top hub, bottom hub, metal weight, cutting blades, pivot bolts, and hex nuts form a rotatable cutting assembly with the apertures thereof in axial alignment and in alignment with the threaded aperture of the drive shaft.

Provided next is a lock bolt 76. The lock bolt has a head. The lock bolt also has a threaded end. The threaded end is positioned through the apertures of the cutting assembly to removably couple with the threaded aperture of the drive shaft.

A plurality of bushings 80 are provided. The bushings are adapted to the various different types of associated fittings of the drive shaft. Each bushing has a top end 82 and a bottom end 84 with a central aperture 86. The top end is in a generally rectangular configuration. A variety of recess are adapted to fit the associated fittings of the drive shaft of the lawn mower. The bottom end is of a preselected configuration with a circumference less than that of the central aperture of the top hub. In this manner, the entire bushing may be positioned within the square recess of the top hub thereby allowing the drive shaft to abut the cutting assembly and allow the locking bolt to pass through the central apertures for releasably securing the cutting assembly to the lawn mower.

Even further provided is a plurality of apertures 90. The apertures are provided on the central region of the top hub. The apertures enable any protuberances from the lawn mower to be adapted to fit with the cutting system.

Last provided are a plurality of flanges 94. The flanges are provided on the central region of the top hub. The flanges enable apertures of the lawn mower to be adapted to fit with the cutting system.

Operation of the lawn mower and blade assembly, in accordance with the present invention includes a plurality of steps as follows:

1. According to the present invention, the universal blade design comes with a 24½ inch cutting width. If an application requires a smaller blade, a user must trim each cutting blade in accordance with the chart below. The mower's length/cut should be labeled on the mower, if not you will have to measure your existing blade. After determining the blade length, find the corresponding measurement in the chart below. The number to the right is the amount you will need to trim from each cutting blade.

| Mower Blade Size | Amount to cut off each blade |
| --- | --- |
| 24" | 1/4" |
| 23" | 3/4" |
| 22" | 1 1/4" |
| 21" | 1 3/4" |
| 20" | 2 1/4" |
| 19" | 2 3/4" |
| 18" | 3 1/4" |
| 17" | 3 3/4" |
| 16" | 4 1/4" |
| 15" | 4 3/4" |
| 14" | 5 1/4" |

2. Insert the metal weight into the oval recess of the bottom hub. Snap the top hub to the bottom hub.

3. Slide the cutting blade into one of the slots on the side of the assembled hubs. Align the holes and push the cutting blade pivot screw through from the bottom. Insert hex nut into hex shaped hole in top hub. Tighten screw using a Phillips screwdriver. Repeat this step for all 8 cutting blades.

4. Determine the appropriate center bushing that fits your mower shaft. To do so compare the center bushings to your existing mower blade. Once you have selected the correct bushing, insert it into the recessed area in the top hub.

5. Attach the blade assembly in the same manner in which you removed your old blade. Because the blade assembly is universal there may be some features that do not apply to your application, just align the blades for the best fit and secure it with existing bolting mechanism removed from your old blade.

6. The present invention is designed so that it will not amputate. There is still the possibility of injury to unprotected flesh. Always wear proper clothing and safety glasses. Follow all safety instructions that came with your mower.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A safe lawn mower blade alternative system for cutting grass without the risk of harmful injury comprising, in combination:

a lawn mower having a motor with a rotatable drive shaft having associated fittings and a threaded aperture formed in the drive shaft;

a bottom hub having a circular configuration with a central circular aperture there through with a lower intermediate plate coupled to the upper surface of the bottom hub with a generally oval recess centered over the central circular aperture and eight generally V-shaped recesses with radiating side edges around an opening into the periphery of the bottom hub;

a top hub having a circular configuration with a central square aperture there through and an upper intermediate plate coupled to the lower surface of the top hub with a generally oval recess centered beneath the central aperture and eight generally V-shaped recesses with radiating side edges around an opening into the periphery of the top hub;

a metal weight having a generally oval configuration with a generally oval aperture through the center thereof, the weight being positioned within the oval recesses of the top hub and bottom hub when coupled together;

eight cutting blades fabricated of plastic each having an interior portion and an intermediate portion and an exterior portion, the interior portion having a generally circular configuration with a hole there through and positioned between the top and bottom hubs, the interior and intermediate portions being relatively rigid and the exterior portion being flexible, the exterior portion adapted to be trimmed to fit various lawn mower sizes, the interior portion being adapted to fit between the V-shaped recesses between the top and bottom hub when in a closed configuration;

eight cutting blade pivot cylinders having a lower end and an upper end and being positioned between the top and bottom hubs and passing through the holes of the blades to thereby allow the blades to pivot in an arc of about 45 degrees with respect to the top hub and bottom hub and with the top hub, bottom hub, metal weight, cutting blades, and cylinders forming a rotatable cutting assembly with the apertures thereof in axial alignment and in alignment with the threaded aperture of the drive shaft;

a lock bolt having a head and threaded end positioned through the apertures of the cutting assembly to removably couple with the threaded aperture of the drive shaft;

a plurality of bushings adapted to the various different types of associated fittings of the drive shaft, each bushing having a top end and a bottom end with a central aperture, the top end being of a generally square configuration with a variety of recesses being adapted to fit the associated fittings of the drive shaft of the lawn mower, the bottom end being of a preselected configuration with a circumference less than that of the central aperture of the top hub such that the entire bushing may be positioned within the square recess of the top hub thereby allowing the drive shaft to abut the cutting assembly and allow the locking bolt to pass through the central apertures for releasably securing the cutting assembly to the lawn mower;

a plurality of apertures on the central region of the top hub to enable any protuberances from the lawn mower to be adapted to fit with the cutting system; and a plurality of flanges on the central region of the top hub enabling apertures of the lawn mower to be adapted to fit with the cutting system.

\* \* \* \* \*